United States Patent
Youn et al.

(10) Patent No.: US 10,270,588 B2
(45) Date of Patent: Apr. 23, 2019

(54) METHOD AND SYSTEM FOR ADDITIVE HOMOMORPHIC ENCRYPTION SCHEME WITH OPERATION ERROR DETECTION FUNCTIONALITY

(71) Applicant: ELECTRONICS AND TELECOMMUNICATIONS RESEARCH INSTITUTE, Daejeon (KR)

(72) Inventors: Taek-Young Youn, Daejeon (KR); Nam-Su Jho, Daejeon (KR); Ku Young Chang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 205 days.

(21) Appl. No.: 15/147,806

(22) Filed: May 5, 2016

(65) Prior Publication Data

US 2016/0330017 A1 Nov. 10, 2016

(30) Foreign Application Priority Data

May 8, 2015 (KR) .................. 10-2015-0064880

(51) Int. Cl.
*H04L 9/00* (2006.01)
*H04L 9/30* (2006.01)

(52) U.S. Cl.
CPC .............. *H04L 9/008* (2013.01); *H04L 9/304* (2013.01)

(58) Field of Classification Search
CPC ............................... H04L 9/304; H04L 9/008
See application file for complete search history.

(56) References Cited

U.S. PATENT DOCUMENTS

| | | | |
|---|---|---|---|
| 8,457,303 B2 | 6/2013 | Joye | |
| 9,094,378 B1* | 7/2015 | Yung | G06F 12/1408 |
| 9,819,650 B2* | 11/2017 | Soon-Shiong | H04L 63/0428 |
| 2002/0174332 A1* | 11/2002 | Vialen | H04L 9/0643 |
| | | | 713/152 |

(Continued)

FOREIGN PATENT DOCUMENTS

| | | |
|---|---|---|
| JP | 2014-22881 A | 11/2014 |
| KR | 10-2014-0114933 A | 9/2014 |

OTHER PUBLICATIONS

Melchor et al., "Additively Homomorphic Encryption with d-Operand Multiplications" Jan. 2008, Advances in Cryptology—CRYPTO 2010, 30th Annual Cryptology Conference, Santa Barbara, CA USA Aug. 15-19, 2010, Proceedings, p. 378.*

(Continued)

*Primary Examiner* — Robert B Leung
*Assistant Examiner* — Thomas Ho (57) ABSTRACT

Provided are a method and a system for an additive homomorphic encryption scheme with operation error detection functionality. A plaintext is obtained by decrypting a ciphertext encrypted based on a homomorphic encryption technique and subjected to an operation and lower setting bits corresponding to additional secret information included in a final private-key are extracted as plaintext information from the acquired plaintext. An operation error check is performed on the remaining bits other than the lower setting bits in the acquired plaintext.

16 Claims, 6 Drawing Sheets

(56) References Cited

U.S. PATENT DOCUMENTS

| | | | | |
|---|---|---|---|---|
| 2002/0188839 | A1* | 12/2002 | Noehring | H04L 29/06 713/153 |
| 2005/0008152 | A1* | 1/2005 | MacKenzie | H04L 9/3013 380/44 |
| 2010/0218037 | A1* | 8/2010 | Swartz | G06F 17/30 714/6.12 |
| 2010/0246812 | A1* | 9/2010 | Rane | H04L 9/302 380/28 |
| 2011/0110525 | A1* | 5/2011 | Gentry | H04L 9/0822 380/285 |
| 2011/0243320 | A1* | 10/2011 | Halevi | H04L 9/008 380/30 |
| 2012/0002811 | A1* | 1/2012 | Smart | H04L 9/085 380/255 |
| 2012/0039473 | A1 | 2/2012 | Gentry et al. | |
| 2012/0269348 | A1* | 10/2012 | Rong | G06F 21/6218 380/278 |
| 2013/0246813 | A1* | 9/2013 | Mori | G06F 17/30289 713/193 |
| 2014/0098951 | A1 | 4/2014 | Choi et al. | |
| 2014/0270159 | A1 | 9/2014 | Youn et al. | |
| 2014/0334622 | A1 | 11/2014 | Smyth et al. | |
| 2015/0372812 | A1* | 12/2015 | Parann-Nissany | H04L 63/06 380/44 |
| 2016/0119119 | A1* | 4/2016 | Calapodescu | H04L 9/30 380/30 |
| 2016/0234686 | A1* | 8/2016 | Bone | H04L 63/062 |

OTHER PUBLICATIONS

Jung Hee Cheon et al., "A New Additive Homomorphic Encryption based on the co-ACD Problem", ACM-CCS 2014, 2014, pp. 287-298.

Jean-Sebastien Coron et al., "Fully Homomorphic Encryption over the integers with Shorter Public Keys", Crypto 2011, 2011, pp. 487-504, vol. 6841.

Martin Van Dijk et al., "Fully Homomorphic Encryption over the Integers", Eurocrypt 2010, 2010, pp. 24-43, vol. 6110, International Association for Cryptologic Research.

* cited by examiner

METHOD AND SYSTEM FOR ADDITIVE HOMOMORPHIC ENCRYPTION SCHEME WITH OPERATION ERROR DETECTION FUNCTIONALITY

CROSS-REFERENCE TO RELATED APPLICATION

This application claims priority to and the benefit of Korean Patent Application No. 10-2015-0064880 filed in the Korean Intellectual Property Office on May 8, 2015, the entire contents of which are incorporated herein by reference.

BACKGROUND OF THE INVENTION (a) Field of the Invention

The present invention relates to an encryption method, and more particularly, to a method and a system for an additive homomorphic encryption scheme with operation error detection functionality.

(b) Description of the Related Art

A homomorphic encryption is a technology of performing an operation for encrypted data based on published information such as a public-key, without plaintext information or secret information on the encrypted data. In detail, even though plaintext data corresponding to a ciphertext are not known, the homomorphic encryption technique is an encryption technique of performing a series of data processing on the ciphertext to apply the operation to the encrypted plaintext data, thereby performing various data processings on the encrypted data without damaging confidentiality of the encrypted information.

Various studies on the homomorphic encryption technique have been made. At an early stage of the researches, limited techniques of preserving only operations of addition or multiplication in the encrypted state have been proposed to raise an interest in direction in which both the two operations may be preserved. Until recently, there is a general recognition that it is difficult to preserve all the operations As only a technique of preserving both of the two operations, a technique based on a pairing operation defined in an elliptic curve has been proposed but has a problem in that the multiplication times is limited once.

Recently, a technique of safely providing the two operations is first designed by Gentry in 2009. Various studies for providing theoretical safety, improving implementation performance, providing application services, or the like using the homomorphic encryption technique based on the Gentry's design scheme have been progressed. However, the new design scheme by the Gentry has a radical limit in performance and therefore may be hardly applied to application environment practically. Therefore, a study on the technology of providing performance that may be practically applied to the application environment has been actively conducted again.

In fact, there are a large number of services that may be provided even when only the addition operation is provided are present in the application environment under which the processing on the encrypted data is performed. In addition, since the Gentry's design scheme has a practical problem in the technology development and a necessity for the practical technology is increased, a demand and a study for the practical technology that may be applied to the practical services as described above are getting increased.

As the study on the homomorphic encryption is getting progressed, there is a need to verify whether information processed based on the data stored in the encrypted state is correctly generated. That is, a method for verifying an error that may occur for various reasons during a computation process is required. However, it is not yet easy to provide the operation at realistic costs in the encrypted state and a necessity for an error detection technology has been recognized but technical solutions are not yet present. In future, a technology of storing the data in the encrypted state when being outsourced, providing various data processing services based on the stored data, and detecting an error occurring during the encrypted data processing to improve reliability of the provided service is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and a system for an additive homomorphic encryption scheme with operation error detection functionality capable of detecting an error occurring during a computation process when an operation for encrypted data is performed.

An exemplary embodiment of the present invention provides an encryption method, including: acquiring a plaintext by decrypting a ciphertext encrypted based on a homomorphic encryption technique and subjected to an operation; extracting lower setting bits corresponding to additional secret information included in a final private-key as plaintext information from the acquired plaintext; and performing an operation error check on the remaining bits other than the lower setting bits in the acquired plaintext.

The performing of the operation error check may include: inducing random numbers corresponding to each index included in a set of indexes allocated to the ciphertext; obtaining a sum of the random numbers induced corresponding to the indexes; and determining whether an error for the operation occurs by comparing the sum of the obtained random numbers with a set value for error determination.

The determining whether the error occurs may include: determining that the error does not occur in the operation performed on the ciphertext when the sum of the obtained random numbers is equal to the set value; and determining that the error occurs in the operation performed on the ciphertext when the sum of the obtained random numbers is not equal to the set value.

The set value may be a value corresponding to an upper setting bit among the remaining bits other than the lower setting bits in the plaintext and the upper setting bit may be an eb+ob bit, in which the eb may represent an information amount for additional data for error detection and the ob may represent a maximum operand.

The additional private information included in the final private-key may be bit information generated based on index information allocated to the ciphertext and a basic private-key.

The ciphertext may be a plaintext encrypted using a final public-key and the final public-key may be a public-key generated based on a basic public-key for the homomorphic encryption technique and additional information for an operation error check.

The additional information may include ub representing an upper value having a data operation result size, eb representing an information amount of additional data for error detection, and ob representing a maximum operand.

Another embodiment of the present invention provides an encryption method, including: generating a final public-key based on a basic public-key for a homomorphic encryption technique and additional information for an operation error check; generating a final public-key based on a basic private-key for the homomorphic encryption technique and additional secret information for an operation error check; and encrypting a plaintext using the final public-key.

The additional information may include ub representing an upper value having a data operation result size, eb representing an information amount of additional data for error detection, and ob representing a maximum operand. The additional information may satisfy $ob \cdot 2^{ub+eb} < N$, in which the N may represent a maximum size of the plaintext.

The additional secret information included in the final private-key may be bit information generated based on index information allocated to the ciphertext and a basic private-key.

The result acquired by performing hash processing on the basic private-key and the index information may be used as secret additional information for an error check.

Yet another embodiment of the present invention provides an encryption system, including: a key generation device including a final public-key generator generating a final public-key based on a basic public-key for a homomorphic encryption technique and additional information for an operation error check and a final private-key generator generating a final private-key based on a basic private-key for the homomorphic encryption technique and additional secret information for an operation error check; and encrypting a plaintext using the final public-key.

The final public-key may be a public-key generated based on a basic public-key for the homomorphic encryption technique and additional information for an operation error check and the additional information may include ub representing an upper value having a data operation result size, eb representing an information amount of additional data for error detection, and ob representing a maximum operand.

The additional secret information included in the final private-key may be bit information generated based on index information allocated to the ciphertext and a basic private-key.

The encryption system may further include: a decryption device decrypting a ciphertext encrypted based on the homomorphic encryption technique and subjected to an operation and performing an error check on the operation.

The decryption device may include: a decryptor decrypting the ciphertext to acquire a plaintext; a plaintext extractor extracting lower setting bits corresponding to additional secret information included in a final secret key as plaintext information from the acquired plaintext; and an error checker performing an operation error check on the remaining bits other than the lower setting bits in the acquired plaintext.

The error checker may include: a random number inducer inducing random numbers corresponding to each index included in a set of indexes allocated to the cipher text; a random number sum calculator obtaining a sum of the random numbers induced corresponding to the indexes; and an error determination processor determining whether an error for the operation occurs by comparing the sum of the obtained random numbers with a set value for error determination.

The error determination processor may determine that an error does not occur in the operation performed on the ciphertext when an sum of the obtained random numbers is equal to the set value and determine that an error occurs in the operation performed on the ciphertext when the sum of the obtained random numbers is not equal to the set value.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, unless explicitly described to the contrary, "comprising" any components will be understood to imply the inclusion of other elements rather than the exclusion of any other elements.

Hereinafter, a method and a system for an additive homomorphic encryption scheme with operation error detection functionality according to an exemplary embodiment of the present invention will be described with reference to the accompanying drawings.

In a homomorphic encryption method according to an exemplary embodiment of the present invention, when an operation (for example, addition) for encrypted data is performed, an error occurring during a computation process is detected.

First, a basic setting and operation scheme for a homomorphic encryption technique will be described.

General information is called a plaintext and a method for hiding contents of the plaintext is called encryption. The encrypted plaintext is called a ciphertext and a method for changing a ciphertext into a plaintext again is called decryption. A public-key algorithm is algorithm using different keys for the encryption and the decryption. Even though a third party knows an encryption key, the third party may not decode the ciphertext and only a person having a decryption key may decrypt the ciphertext. Due to these features, the encryption key is published and the decryption key is hidden and the encryption key is called a public-key and the decryption key is called a private-key.

Here, the basic setting and operation scheme of the homomorphic encryption technique based a Paillier technique will be described. However, the present invention is not limited to the Paillier technique but may be applied to all the homomorphic encryption techniques supporting an addition of integer.

The encryption technique of Paillier is configured as follows.

First, a key is generated. Two prime numbers p and q having a size for providing safety for a factorization problem are selected. The two prime numbers p and q or $\Phi$ (N) may be used as the private-key. Here, $\Phi$ represents an Euler function.

N=pq is calculated based on the two prime numbers generated by the private-key and $N^2$ is used as a public module. Since a digit for multiplication is N·$\Phi$ (N), a number system for modulo $N^2$ has an element in which the digit is N and an element in which the digit is $\Phi$ (N). A generation source g in which the digit is N and a generation source h in which the digit is $\Phi$ (N) are searched. The two generation sources may be calculated by the following method.

If any element a is selected and is calculated by $g=a^{\Phi(N)}$ mod $N^2$, the digit of g becomes N. g=1+N is also given the same characteristics. Hereinafter, the case in which g=1+N will be described. Similar to g, if h selects any element b and is calculated by $h=b^N$ mod $N^2$, the digit of h becomes $\Phi$ (N).

The public information generated by the process is $N^2$, g, and h. In the encryption technique of Paillier, a random number r for encryption is selected and a ciphertext for plaintext m is calculated as follows.

$$c=(1+mN)h^r \bmod N^2 \quad \text{(Equation 1)}$$

The decryption for c depends on the following Equation.

$$m=((c^{\Phi(N)} \bmod N^2)-1)\cdot\Phi(N)^{-1} \bmod N \quad \text{(Equation 2)}$$

In the encryption and decryption process, a plaintext is selected from $Z_N$.

In the homomorphic encryption technique (for example, Paillier's encryption technique) according to the exemplary embodiment of the present invention, verification on an error that may occur for various reasons during the computation process is performed.

First, in the method for an additive homomorphic encryption scheme with operation error detection functionality according to the exemplary embodiment of the present invention that may detect the operation error, a process of generating additional information including a key will be described.

Figure 1:
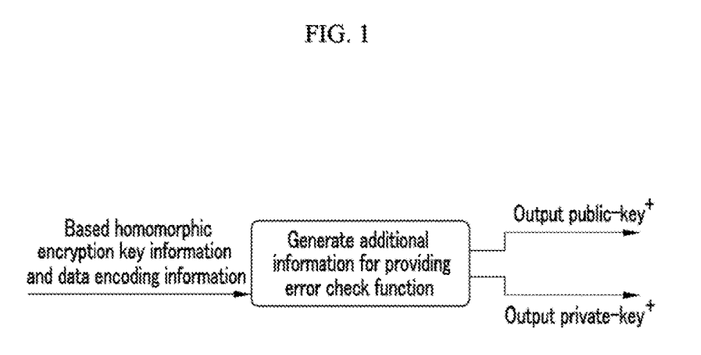
FIG. 1 is a diagram illustrating a key generation process including additional information according to an exemplary embodiment of the present invention.

FIG. 1 is a diagram illustrating a key generation process including additional information according to an exemplary embodiment of the present invention.

According to the exemplary embodiment of the present invention, as illustrated in FIG. 1, key information including a public-key and a private-key of the homomorphic encryption technique (or basis encryption technique) that is a basis and information required for data encoding for providing an additional function are used as an input to generate a public-key$^+$ and a private-key$^+$ that will be used in the homomorphic encryption capable of verifying the operation error.

By the process of generating the additional information for providing the error check function, a key for providing a verification function on an operation error is generated. The public-key$^+$ and the private-key$^+$ are generated based on the public-key, the private-key, and the data encoding information of the basis encryption technique that is an object to which the error check function will be provided.

In the case of the Paillier's technique, a size of N is defined by the operation module for safety, and as a result an integer size that may be operated is determined. Three variables for providing an additional function according to the exemplary embodiment of the present invention are additionally defined. Here, the additional function includes the error check function for the operation. The three variables includes an upper value ub of the data operation result size, an information amount eb of additional data for error detection, and a maximum operand (a maximum value of an operation (for example: addition) frequency for encryption data) ob.

A value consisting of three variables is formed. The value may be configured like $ob \cdot 2^{ub+eb}$. The value consisting of the three variables needs to be smaller than a maximum size of the plaintext that may be represented by the—based encryption technique, and therefore the value consisting of three variables satisfies a condition of $ob \cdot 2^{ub+eb} < N$. To satisfy the condition, the value of the three variables may be selected. For example, when 1025 bit N is used, 80 bit additional data eb for error detection is used, and an addition operation of about 1,000,000 ($\approx 2^{20}$) times or less (ob) is performed, the method according to the exemplary embodiment of the present invention may be applied to processing data, in which the upper value ub of the data operation result size, that is, a total size of the operation sum is smaller than $2^{924}$ ($\approx 10^{278}$), by the above condition $2^{20+ub+80} < 2^{1024}$. By the selection, the method according to the exemplary embodiment of the present invention may be applied to a set of plaintexts in which the upper value of the data operation result size is smaller than $2^{ub}$.

The set of plaintexts satisfying the condition ($ob \cdot 2^{ub+eb} < N$) of the data operation as described above is said to be M. In this case, in the public-key$^+$ according to the exemplary embodiment of the present invention, three variables ub, eb, and ob are further included in the existing public-key information (public-key included in key information input in FIG. 1).

When the method for generating additional information according to the exemplary embodiment of the present invention is applied to other encryption techniques other than the Paillier technique, instead of N, the upper value of the operation provided from the corresponding encryption technique is set as a condition variable according to the condition of the above data operation to select three variables as described above and the public-key$^+$ is generated based on the selected three variables to identically apply the corresponding encryption technique. For convenience of explanation, the three variables may be called the "additional information".

Meanwhile, the private-key included in the key information in FIG. 1 is a private-key for encryption/decryption generated according to the basis encryption technique and the private-key$^+$ according to the exemplary embodiment of the present invention is a private-key including the additional private information for an error check. The additional private information (or called eb bit information) for the error check may be generated by various schemes.

Basically, it is assumed that index information uniquely designating the ciphertext is present in each ciphertext. In this case, the index information is type information and may be added in front of the ciphertext and an order present in a set of the ciphertexts may also be the corresponding index information. In this, case, the additional private information for the error check is a private random number generated in the index information. The private random number is generated from the index information by a scheme that may be known only in the encryption performance side and thus may be used as the additional information (eb bit information) for the error check. For example, the result acquired by performing hash processing on the private-key and the index information owned by the encryption performer may be used as the additional information for the error check. This is one example and is not limited to the present invention.

According to the exemplary embodiment of the present invention, the eb bit information generated based on the index information and the private information (private-key) that are allocated to the ciphertext is used as the additional information for the error check, and as a result the additional private information for the error check becomes the private-key$^+$ while being included in the private-key of the basis encryption technique.

Next, the encryption is performed based on the public-key$^+$ generated as described above.

Figure 2:
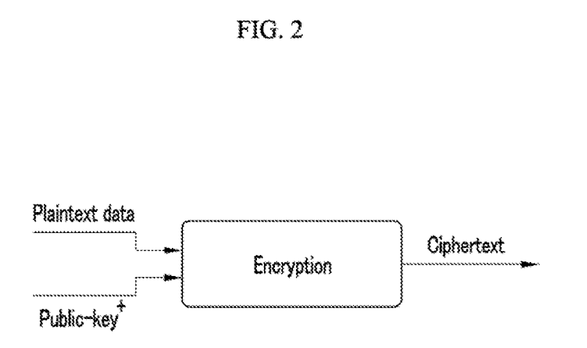
FIG. 2 is a diagram illustrating an encryption process according to an exemplary embodiment of the present invention.

FIG. 2 is a diagram illustrating an encryption process according to an exemplary embodiment of the present invention.

Here, the process of encrypting the plaintext selected from the set of plaintexts defined according to the exemplary embodiment of the present invention will be described. For example, the encryption process based on the Paillier technique will be described with reference to FIG. 2.

A plaintext m selected from the plaintext data, that is, the set M of plaintexts satisfying the condition of the above-mentioned data operation and the public-key$^+$ are used as the input and thus as illustrated in FIG. 2, the encryption of the plaintext m is performed as follows.

Index information idx uniquely allocated to each ciphertext is selected, any random number $r_{idx}$ is generated based on the selected index information, and the selected plaintext is encoded as follows using the generated random number and the public-key$^+$.

$$m' = r_{idx} \cdot 2^{ub} + m \quad \text{(Equation 3)}$$

A scheme of generating the random number $r_{jdx}$ is kept secret and reliable subjects of which the encryption generation is permitted share it. The random number $r_{jdx}$ may be generated by using the scheme as described in FIG. 1. At the time of the process of generating the random number rjdx as described above, an approach method using a key or algorithm type of secret sharing may be applied and the method is not limited.

Any random number r is selected and a ciphertext c for a plaintext m' encoded as described above is calculated as follows.

$$c = (1 + m'N) \cdot h^r \mod N^2 \quad \text{(Equation 4)}$$

The index information idx allocated to the ciphertext according to the application environment may also be stored along with the ciphertext c and if not necessary, the index information idx is not stored and only the ciphertext may be stored.

The operation may be performed on the so generated ciphertext.

The operation may be performed on the encrypted plaintext data, that is, the encryption data. Here, an encryption data addition process will be described as an example. The encryption data addition process may use a published technology and does not correspond to the scope of the present invention, and therefore is not described with reference to separate drawings. However, the encryption data addition process will be briefly described to help understanding of the present invention.

For example, if two ciphertexts $c_1$ and $c_2$ for plaintexts $m_1$ and $m_2$ are given, a ciphertext $c_3$ for the addition operation result of the plaintexts $m_1$ and $m_2$, that is, a sum of $m_1$ and $m_2$ may be calculated.

$$c_3 = c_1 \cdot c_2 \mod N^2 \quad \text{(Equation 5)}$$

Allowing the simple multiplication operation to preserve the sum of the two encrypted plaintexts may be confirmed by the following Equation.

$$c_1 \cdot c_2 = (1 + m_1 N) \cdot h^{r_1} \cdot (1 + m_2 N) \cdot h^{r_2} = (1 + (m_1 + m_2)N) \cdot h^{r_1 + r_2} \mod N^2 \quad \text{(Equation 6)}$$

For the operation, there is a need to verify whether to correctly generate the processed information based on the data stored in the encrypted state.

Next, the decryption and error checking process for the ciphertext acquired by the above-mentioned decryption process will be described.

Figure 3:
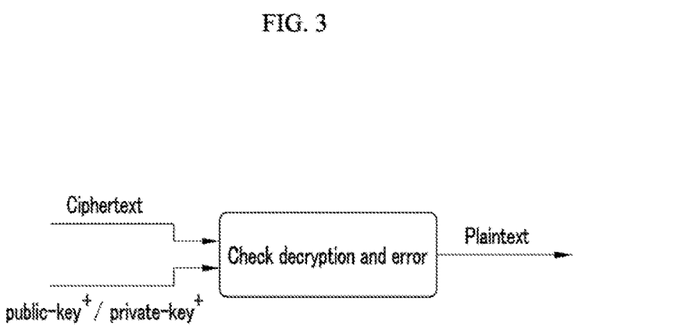
FIG. 3 is a diagram illustrating a decryption and error checking process according to an exemplary embodiment of the present invention.

FIG. 3 is a diagram illustrating a decryption and error checking process according to an exemplary embodiment of the present invention.

The ciphertext c is decrypted by the following process and the error of the operation process is checked.

As illustrated in FIG. 3, the decryption and error checking process is performed based on the given ciphertext c and the public-key$^+$ and the private-key$^+$ according to the exemplary embodiment of the present invention.

For the given ciphertext c, the plaintext m' is calculated as follows.

$$m' = c((c^{\Phi(N)} \mod N^2) - 1) \cdot \Phi(N)^{-1} \mod N \quad \text{(Equation 7)}$$

The plaintext information is extracted based on the additional private information (eb bit information) for checking the error included in the private-key$^+$ in the m' calculated according to the above Equation 7. In detail, low-order bits in the m', that is, a lower setting bit (lower ub bit) corresponding to the eb bit information is extracted as plaintext information. The rest other than the lower ub bit information in the m' is used for the operation error check.

For the error check of the operation result according to the exemplary embodiment of the present invention, the set of the indexes allocated to the ciphertext that is the operation object is required. The addition for a total n of data is performed and if each index is idx_1, . . . , idx_n, it is confirmed whether random numbers $r_{idx\_i}$ corresponding to each index idx_i are induced and a sum of induced random numbers $r_{idx\_i}$ is equal to upper setting bits of m'. The upper setting bit corresponds to an eb+ob bit. Among the rest other than the lower ub bit information in the m', the upper eb+ob bits are used for the error check.

Here, to induce the random number $r_{idx\_i}$, various schemes may be used. For example, persons allowed to perform the encryption share the random numbers and may use a scheme (method for inducing a first random number) of generating a hash value using each index information and the shared random numbers as the input to induce the random number. Alternatively, values of a polynomial function may be obtained using the index as an input in the state in which encryption authority owners share private coefficients of any polynomial function to use them as the random number (method for inducing a second random number). The two methods for inducing a random number are described, but the present invention is not limited the method for inducing a random number and therefore any method may be used as long as they are a method for allowing only persons sharing secret information to perform a computation upon the encryption generation.

When the sum of the induced random numbers $r_{idx-i}$ is equal to the upper setting bit (eb+ob bit) of the m', it is determined that the error does not occur in the operation and when the sum is not equal to the upper setting bit (eb+ob bit) of the m', it is determined that the error occurs.

The exemplary embodiment of the present invention is based on an basic idea of dividing a plaintext region of the homomorphic encryption technique to which an addition of a number basically larger than the set value is provided into two and processing them (lower ub bits in the m' and the rest bits other than the lower ub bits). In detail, when the operation is performed on the data to be encrypted and the corresponding data included in lower-order bit and high-order bit regions having an enough distance not to reach the regions upon the addition performance of the larger number, by dividing the verification data for verifying it and storing it, even though the addition of the large number is performed, the data operation result and the processing result of the verification information are present independently and it may be checked whether the operation performed based on the verification information is correct.

By generalizing the idea, it may be understood as a technology of dividing the plaintext region of the basis technique into a plurality of independent regions when considering the operation for the addition of the plaintext region. As such, different values may be stored in the independently managed region to simultaneously progress different addition operations in parallel. The characteristics may provide various merits. Therefore, the scope of the present invention is not limited to providing the error check function and may be understood as providing a general function of dividing a plaintext space into a plurality of spaces and using them.

According to the exemplary embodiment of the present invention, when the operation (addition) for the encrypted data in the homomorphic encryption technique is performed, the error occurring during the computation process may be detected.

Various errors occurring upon the encryption data operation may be detected and therefore the operation error that may occur even though a service provider has good intentions in the homomorphic encryption technology may be confirmed. Therefore, the encrypted data are stored in an external server and in a service outsourcing the processing thereon, reliability of the data processing result may be improved.

Hereinafter, the processes as described above will be described based on a flow chart.

Figure 4:
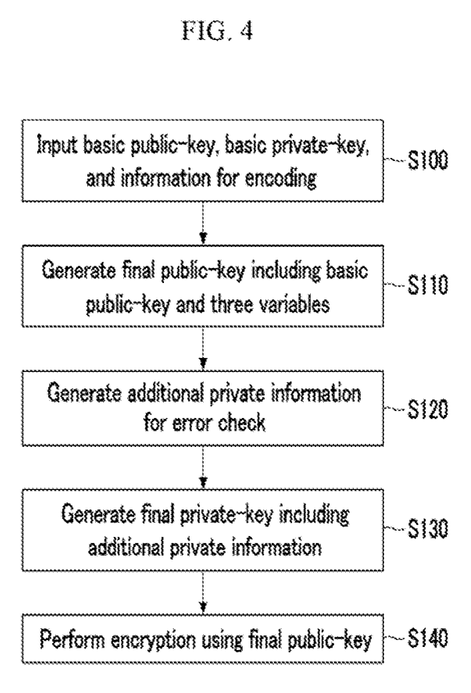
FIG. 4 is a flow chart of a key generation and encryption process in an encryption method according to an exemplary embodiment of the present invention.

FIG. 4 is a flow chart of a key generation and encryption process in an encryption method according to an exemplary embodiment of the present invention.

For the encryption based on the homomorphic encryption technique, the public-key$^+$ and the private-key$^+$ according to the present embodiment of the present invention are generated.

Here, for convenience of explanation, the private-key of the basis encryption technique is called "basic private-key' and the private-key$^+$ according to the exemplary embodiment of the present invention is called the 'final private-key". Further, the previously known public-key is called the "basic public-key" and the public-key$^+$ according to the exemplary embodiment of the present invention is called the "final public-key".

In detail, the basic public-key, the basic private-key, and the information (three variables, etc.,) required for data encoding are input (S100) and the public-key$^+$ including the three variables according to the exemplary embodiment of the present invention, that is, the final public-key are generated (S110). Here, the three variables include the upper value of the data operation result size, the information amount of the additional data for the error detection, and the maximum operand. A value (ob·$2^{ub+eb}$) consisting the three variables satisfies a condition smaller than the maximum size of the plaintext that may be represented in the encryption technique.

Further, the private-key$^+$, that is, the final private-key is generated. The private-key used in the basis encryption method and the additional private information for the error check are generated (S120) and the final private-key including the additional private information is generated (S130). The additional private information for the error check may be a private random number generated from the index information designated for the ciphertext. The private random number may be generated by various methods. For example, the result acquired by performing the hash processing on the private-key (private-key used in the basis encryption method) owned by the encryption performer and the index information may be used as the additional private information for the error check.

Next, the encryption is performed on the plaintext selected in the set of plaintexts satisfying the condition of the data operation (S140).

The index information uniquely allocated to each ciphertext is selected, any random number is generated based on the selected index information, and the selected plaintext is encoded using the generated random number and the final public-key. Further, any random number is selected and the ciphertext for the encoded plaintext is calculated.

The operation may be performed on the ciphertext generated according to the encryption. For example, the addition of a number larger than the set value may be performed on the ciphertext.

Figure 5:
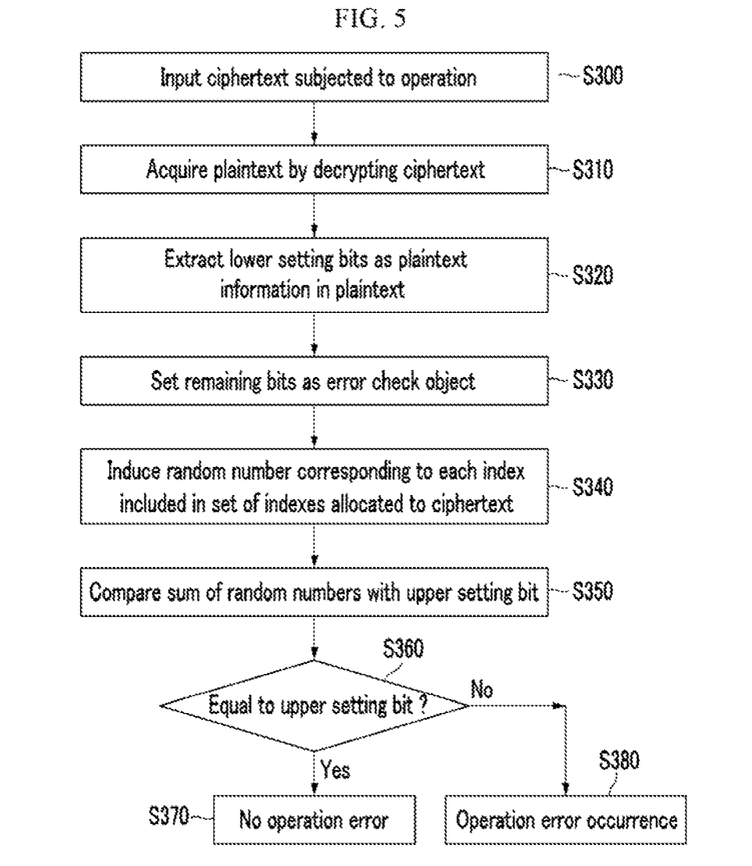
FIG. 5 is a flow chart of a decoding and error checking process in an encryption method according to an exemplary embodiment of the present invention.

FIG. 5 is a flow chart of a decoding and error checking process in an encryption method according to an exemplary embodiment of the present invention.

The encryption is performed based on the homomorphic encryption technique as described above and the decryption is performed on the ciphertext subjected to the operation.

First, the ciphertext subjected to the operation is received (S300). The decryption is performed on the ciphertext using the final private-key to obtain the plaintext (S310).

Further, the plaintext information is extracted in the obtained plaintext (S320). In detail, the lower setting bits corresponding to the additional private information included in the final private-key are extracted as the plaintext information in the encoded plaintext. Further, the operation error check is performed on the remaining bits other than the lower setting bits in the plaintext.

For the error check of the operation result, the random numbers corresponding to each index included in the set of indexes allocated to the ciphertext are induced (S340). The sum of the induced random numbers corresponding to the indexes is obtained and the obtained sum of the random numbers and the set value for the error determination are compared with each other (S350). Here, the set value is a value corresponding to the upper setting bits among the remaining bits other than the lower setting bits. The upper setting bit is an eb+ob bit.

When the obtained sum of random numbers is equal to the set value, that is, the upper setting bit, it is determined that an error does not occur in the operation performed on the ciphertext (S360 and S370). On the other hand, when the sum of random numbers is not equal to the set value, that is, the upper setting bit, it is determined that the error occurs in the operation performed on the ciphertext (S380).

Figure 6:
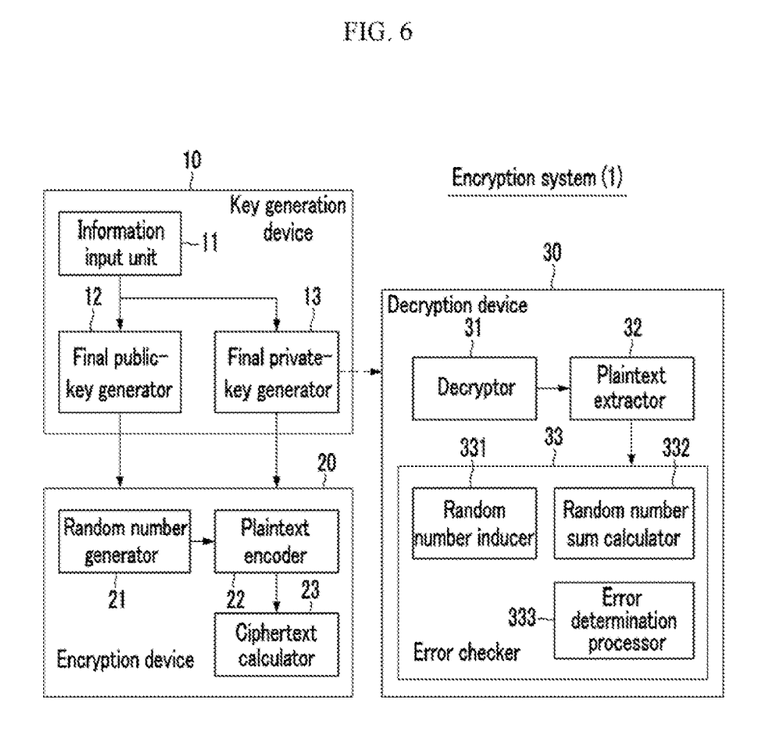
FIG. 6 is a diagram illustrating a structure of an encryption system according to an exemplary embodiment of the present invention.

FIG. 6 is a diagram illustrating a structure of an encryption system according to an exemplary embodiment of the present invention.

An encryption system 1 according to an exemplary embodiment of the present invention includes at least one of a key generation device 10, an encryption device 20, and a decryption device 30.

The key generation device 10 includes an information input unit 11, a final public-key generator 12, and a final private-key generator 13.

The information input unit 11 receives the basic public-key, the basic private-key, and the information (three variables, etc.) required for the data encoding.

The final public-key generator 12 generates the basic public-key and the public-key$^+$ including the three variables, that is, the final public-key. Here, the three variables include the upper value of the data operation result size, the information amount of the additional data for the error detection, and the maximum operand.

The final private-key generator 13 generates the additional private information for the error check and generates the final private-key including the additional private information and the basic private-key. The additional private information is generated based on the index information allocated to the ciphertext and the basic private-key and may be included in the basic private-key.

The encryption device 20 performs the encryption on the plaintext using the final public-key. Here, the plaintext may be selected from the set of plaintexts satisfying the condition of the data operation. For this purpose, the encryption device 20 includes a random number generator 21, a plaintext encoder 22, and a ciphertext calculator 23.

The random number generator 21 selects the index information uniquely allocated to each ciphertext and generates any random number based on the selected index information.

The plaintext encoder 22 uses the generated random number and the final public-key to encode the selected plaintext.

The ciphertext calculator 23 selects any random number and uses the selected random number to calculate the ciphertext for the encoded plaintext.

The decryption device 30 performs the decryption on the ciphertext encrypted and operated based on the homomorphic encryption technique. For this purpose, the decryption device 30 includes a decoder 31, a plaintext extractor 32, and an error checker 33.

The decoder 31 performs decoding on the ciphertext using the final private-key to obtain the plaintext.

The plaintext extractor 32 extracts the plaintext information in the acquired plaintext. In detail, the plaintext extractor 32 extracts the lower setting bits corresponding to the additional private information included in the final private-key as the plaintext information in the plaintext.

The error checker 33 performs the operation error check on the remaining bits other than the lower setting bits in the plaintext.

For this purpose, the error checker 33 includes a random number inducer 331 inducing the random numbers corresponding to each index included in the set of indexes allocated to the ciphertext, a random number sum calculator 332 obtaining the sum of induced random numbers corresponding to the indexes, and an error determination processor 333 comparing the obtained sum of random numbers with the set value for the error determination. Here, the set value is the value corresponding to the upper setting bits among the remaining bits other than the lower setting bits. The upper setting bit is an eb+ob bit.

The error determination processor 332 determines that the error does not occur in the operation performed on the ciphertext when the obtained sum of random numbers is equal to the upper setting bit. On the other hand, when the sum of random numbers is not equal to the set value, that is, the upper setting bit, it is determined that the error occurs in the operation performed on the ciphertext.

The encryption system according to the exemplary embodiment of the present invention having the above structure may be applied to the application service environment. For example, the original owner of the data generates the ciphertext to be outsourced to a data outsourcing server, for example, a storage server and the storage server provides the outsourced ciphertext to the original owner of the data if necessary. In particular, if necessary, the storage servers may perform the operation on the outsourced ciphertext to be applied to the application service environment provided to the original owner of the data. In this case, the original owner of the data may be implemented in a form including an encryption system 1 according to the exemplary embodiment of the present invention.

For example, the original owner of the data uses the homomorphic encryption technique to which the addition is provided in the state in which the plurality of data are encrypted to encrypt the data as different ciphertexts and outsource the ciphertexts to the storage server. Further, the original owner of the data may request the server to calculate the sum of some values of the data stored in the storage server, if necessary. In this case, the sum of requested data among the data stored in the storage server is calculated in the encrypted state and may be transmitted to the original owner of the data requesting it.

The original owner of the data receives one ciphertext in which the result is encrypted and the ciphertext itself includes the information that may verify the error for the requested data processing result, and therefore as described above, the original owner of the data performs the operation error check to confirm whether the operation is performed properly. That is, even though the original owner of the data storing the individual information, etc., in the storage server receives only the results calculated and transmitted by the storage server, it may be confirmed whether the operation requested by the original owner is performed properly.

Therefore, it is possible to improve the reliability of the encryption data outsourcing and the outsourcing information based data processing service Further, the method according to the exemplary embodiment of the present invention may be easily applied to the homomorphic encryption technique to which the existing operation (for example, addition of large number) is provided without largely deforming the configuration of the basis technology and therefore has the high utilization.

Meanwhile, the present specification describes the detailed exemplary embodiments but various changes may be practiced without departing from the scope of the present invention. That is, the method for generating variables described in the present invention is not limited and therefore may be selected and implemented as long as the method does not violate the described object.

According to an exemplary embodiment of the present invention, it is possible to detect various errors occurring upon the operation of the encryption data.

Further, when the addition for the data encrypted with the encryption data operation outsourcing service using the homomorphic encryption technique is performed, even though the original owner of data receives only the results, the additional function of confirming whether the operation requested by the original owner is performed property may be provided. Since the function of confirming whether the error occurs during the data processing in the encryption data outsourcing and the outsourcing information-based data processing services due to the characteristics is provided, the improvement in the corresponding service reliability may be expected.

The exemplary embodiments of the present invention described above are not implemented through only apparatuses (objects) and methods, but may also be implemented through a program executing functions corresponding to configurations of the method of the exemplary embodiments of the present invention and a recording medium readable with a computer in which the program is recorded. In addition, these implementations may be easily made by those skilled in the art to which the present invention pertains from the exemplary embodiments described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A computer-implemented encryption method, comprising:
    acquiring a plaintext by decrypting a ciphertext that is encrypted based on an additive homomorphic encryption technique with a final public key and then subjected to an addition operation;
    extracting least significant bits corresponding to additional secret information included in a final private-key as plaintext information from the acquired plaintext, the final private-key corresponding to the final public key and including the additional secret information and a basic private-key; and
    performing an operation error check using the remaining bits other than the least significant bits in the acquired plaintext, wherein the operation error check is performed to check whether an error occurs in the addition operation performed on the ciphertext,
    wherein the method further comprises generating the additional secret information based on index information allocated to the ciphertext and the basic private-key and generating the final private-key including the additional secret information and the basic private key.

2. The computer-implemented decryption method of claim 1, wherein:
    the performing of the operation error check includes:
    inducing a random number corresponding to each of indexes included in the index information allocated to the ciphertext;
    obtaining a sum of the random numbers induced corresponding to the indexes; and
    determining whether an error for the addition operation occurs by comparing the sum of the random numbers with a set value,
    wherein the set value is based on the remaining bits for error determination.

3. The computer-implemented encryption method of claim 2, wherein:
    the determining whether the error occurs includes:
    determining that the error does not occur in the addition operation performed on the ciphertext when the sum of the random numbers is equal to the set value; and
    determining that the error occurs in the addition operation performed on the ciphertext when the sum of the random numbers is not equal to the set value.

4. The computer-implemented encryption method of claim 2, wherein:
    the set value is a value corresponding to a most significant bit among the remaining bits other than the least significant bits in the plaintext and the most significant bit is an (eb+ob) bit, in which the eb represents an information amount for additional data for error detection and the ob represents a maximum operand.

5. The computer-implemented encryption method of claim 1, wherein:
    the ciphertext is obtained by encrypting the plaintext using a final public-key and the final public-key is a public-key generated based on a basic public-key for the additive homomorphic encryption technique and additional information for the operation error check.

6. The computer-implemented encryption method of claim 5, wherein:
    the additional information includes ub representing an upper limit value having a data operation result size, eb representing an information amount of additional data for error detection, and ob representing a maximum operand.

7. A computer-implemented encryption method, comprising:
    generating a final public-key based on a basic public-key for an additive homomorphic encryption technique and additional information for an operation error check;
    generating a final private-key based on a basic private-key for the additive homomorphic encryption technique and additional secret information for the operation error check; and
    encrypting a plaintext using the final public-key to thereby generate a ciphertext,
    wherein the additional information includes ub representing an upper limit value having a data operation result size, eb representing an information amount of additional data for error detection, and ob representing a maximum operand.

8. The computer-implemented encryption method of claim 7, wherein:
    the additional information satisfies $ob \cdot 2^{ub+eb} < N$, in which the N represents a maximum size of the plaintext.

9. The computer-implemented encryption method of claim 7, wherein:
    the additional secret information included in the final private-key is bit information generated based on index information allocated to the ciphertext and the basic private-key.

10. The computer-implemented encryption method of claim 9, wherein:
    the result acquired by performing hash processing on the basic private-key and the index information is used as the additional secret information for the operation error check.

11. An encryption system, comprising:
an encryption device; and
a key generation device,
wherein the key generation device includes:
- a final public-key generator generating a final public-key based on a basic public-key for an additive homomorphic encryption technique and additional information for an operation error check; and
- a final private-key generator generating a final private-key based on a basic private-key for the additive homomorphic encryption technique and additional secret information for the operation error check, wherein the encryption device encrypts a plaintext using the final public-key to thereby generate a ciphertext, and wherein the final private-key generator generates the additional secret information based on index information allocated to the ciphertext and the basic private-key.

12. The encryption system of claim 11, wherein the final public-key generator generates
the final public-key based on a basic public-key for the homomorphic encryption technique and additional information for the operation error check, and the additional information includes ub representing an upper limit value having a data operation result size, eb representing an information amount of additional data for error detection, and ob representing a maximum operand.

13. The encryption system of claim 11, further comprising:
a decryption device decrypting a ciphertext encrypted based on the homomorphic encryption technique and subjected to an addition operation and performing the operation error check on the decrypted ciphertext.

14. The encryption system of claim 13, wherein:
the decryption device includes:
- a decryptor decrypting the ciphertext subjected to the addition operation to acquire a plaintext;
- a plaintext extractor extracting least significant bits corresponding to additional secret information included in the final private-key as plaintext information from the acquired plaintext; and
- an error checker performing the operation error check using the remaining bits other than the least significant bits in the acquired plaintext, wherein the operation error check is performed to check whether an error occurs in the addition operation performed on the ciphertext.

15. The encryption system of claim 14, wherein:
the error checker includes:
- a random number inducer inducing a random number corresponding to each of indexes in index information allocated to the ciphertext subjected to the addition operation;
- a random number sum calculator obtaining a sum of the random numbers induced corresponding to the indexes; and
- an error determination processor determining whether an error for the addition operation occurs by comparing the sum of the random numbers with a set value, wherein the set value is based on the remaining bits for error determination.

16. The encryption system of claim 15, wherein:
the error determination processor determines that an error does not occur in the addition operation performed on the ciphertext when the sum of the random numbers is equal to the set value and determines that an error occurs in the addition operation performed on the ciphertext when the sum of the random numbers is not equal to the set value.

* * * * *